United States Patent [19]

Van Gompel

[11] Patent Number: 4,753,840

[45] Date of Patent: Jun. 28, 1988

[54] COATED FABRIC

[75] Inventor: Paul T. Van Gompel, Hortonville, Wis.

[73] Assignee: Kimberly-Clark Corporation, Neenah, Wis.

[21] Appl. No.: 690,350

[22] Filed: Jan. 10, 1985

[51] Int. Cl.$^4$ .............................................. B32B 5/14
[52] U.S. Cl. ................................. 428/171; 428/172; 428/218; 428/284; 428/226; 428/287; 428/913; 604/365; 604/366; 604/379; 604/380
[58] Field of Search .............. 428/171, 172, 198, 284, 428/287, 296, 218, 161, 913, 286, 219, 195; 604/365, 366, 379, 380

[56] References Cited

U.S. PATENT DOCUMENTS

| | | | |
|---|---|---|---|
| 4,027,672 | 6/1977 | Harami | 604/380 |
| 4,055,454 | 10/1977 | Laske | 428/296 |
| 4,379,192 | 4/1983 | Wahlquist et al. | 428/171 |
| 4,443,512 | 4/1984 | Delvaux | 428/171 |
| 4,454,187 | 6/1984 | Flowers et al. | 428/172 |

*Primary Examiner*—James J. Bell
*Attorney, Agent, or Firm*—Douglas L. Miller

[57] ABSTRACT

A coated fabric comprises a base ply of a fiber material such as a non-woven fiber material, for example, a polypropylene non-woven material, having a thermoplastic film, for example, an ethylene methyl acrylate film, bonded thereto. The base ply has densified and undensified portions thereof, the densified portions defining densified areas on a coating surface of the base ply, and the thermoplastic film is heat-bonded to the coating surface at least at the densified portions thereof. A method of making the coated fabric comprises contacting the thermoplastic film in heat-softened condition with the coating surface of the base ply, and allowing the film to cool.

12 Claims, No Drawings

COATED FABRIC

BACKGROUND OF THE INVENTION

The present invention is concerned with a thermoplastic film-coated fabric, more particularly with a thermoplastic film-coated fiber material which is well suited for use in incontinence control garments, surgical gowns, sheets, dressings and the like as well as in feminine hygiene products, and to a method for the manufacture of such thermoplastic-coated fabrics.

The coating of thermoplastic films on fiber materials, including non-woven synthetic fiber materials, is known in the art. For example, U.S. Pat. No. 4,275,105 discloses a stablized absorbent rayon web which may constitute a continuous filament, spun-bonded web or an air-laid, wet-laid or carded web of rayon fibers of staple length or longer into which a thermoplastic web having open areas is melted from the bottom surface thereof to a depth of about 10 to 40% of the depth of the web. A number of thermoplastic films including, among others, polyethylene, polypropylene, polyester and ethylene methyl acrylate are disclosed.

U.S. Pat. No. 4,367,112 discloses a biaxially oriented polypropylene film stated to exhibit improved heat-seal strength and good optical clarity characterized by having on at least one surface thereof a continuous coating of a copolymer of ethylene and methyl acrylate. Similarly, U.S. Pat. No. 4,076,895 discloses that ethylene acrylic acid copolymers or ethylene-acrylic acid ester copolymers such as ethylene/ethyl acrylate and ethylene/methyl acrylate may be used as extrusion coatings on transparent, polymeric webs such as oriented polypropylene, cellophane, polyesters, nylon, etc. in order to impart transparency to the multi-layered film resulting from the process. In a similar vein, U.S. Pat. No. 4,416,937 discloses that a variety of somewhat polar synthetic thermoplastic polymers such as random copolymers of ethylene with acrylic or methacrylic acid are known to exhibit reasonably good adhesion to a variety of metallic and nonmetallic substrates.

SUMMARY OF THE INVENTION

In accordance with the claimed invention there is provided a coated fabric comprising a base ply of a fiber material, preferably a non-woven fabric, having densified and undensified portions thereof, the densified portions defining densified areas on at least one surface, designated the coating surface, of the base ply; and a thermoplastic film heat-bonded to the coating surface at least at the densified areas thereof.

In one aspect of the invention, the fiber density of the densified portions of the base ply is at least about one and one-fourth times greater than that of the undensified portions of the base ply and the densified portions define a repeating pattern of densified portions in the base ply. The densified portions are preferably flush with or protrude above the coating surface.

In another aspect of the invention, the fiber material comprises a polyolefin fiber material, preferably a polypropylene fiber material. The thermoplastic film may be selected from the group consisting of polymers of propylene, ethylene methyl acrylate, ethylene vinylacetate, ethylene, block copolymers of butadiene and styrene, ethylene ethyl acrylate, ethylene methyl methacrylates, and compatible copolymers of two or more of the foregoing. The thermoplastic film is preferably an ethylene acrylate film, more preferably an ethylene methyl acrylate film, and most preferably the latter is coated on a base ply comprising a non-woven polypropylene fiber material.

Another aspect of the invention provides a coated fabric comprising: a base ply of non-woven polyolefin fiber material having densified and undensified portions thereof defining an interspersed pattern of densified and undensified areas on at least one surface, designated as the coating surface, of the base ply; and a thermoplastic film heat-bonded to the coating surface at least at the densified areas thereof, the depth of penetration of the film into the base ply being limited so that the thermoplastic film comprises a surface coating on the coating surface of the base ply.

In another aspect of the invention the base ply may comprise fibers of polypropylene, polyethylene, polypropylene sheathed with polyethylene, polyesters, rayon, nylon and blends of two or more of the foregoing.

In accordance with the claimed invention there is also provided a method of making a coated fabric comprising: heat-bonding a thermoplastic film to a base ply of a fiber material, preferably a non-woven fiber material, the base ply having densified and undensified portions thereof and the densified portions extending to at least one surface, designated the coating surface, of the base ply; the heat-bonding being carried out by contacting a surface of the thermoplastic film in a heat-softened condition with the coating surface of the base ply, and allowing the film to cool.

One aspect of the invention includes maintaining the temperature of the thermoplastic film and the pressure of the contacting of the film and base ply such that the depth of penetration of the film into the base ply is less than the depth of the base ply and forming the film into a surface coating on the coating surface of the base ply.

Another aspect of the invention includes the preliminary step of forming a pattern of densified and undensified portions in the base ply.

In a preferred aspect of the invention, the heat-softened film comprises ethylene methyl acrylate and is at a temperature of about 275° C. to 315° C., preferably about 293° C. to 315° C., upon initial contact with the base ply, which is preferably a non-woven polypropylene fabric.

Other aspects of the method of the invention include utilizing in the method one or more of the materials described above as comprising the coated fabric of the invention.

Still other aspects of the invention provide for a multi-ply incontinence garment wherein the outermost ply thereof comprises the fabric of the invention with the base ply thereof facing outwardly.

DETAILED DESCRIPTION OF THE PREFERRED EMBODIMENTS

The coated fabric of the present invention has utility in a number of applications including incontinence control garments, surgical gowns, sheets and dressings and feminine hygiene products. At least in preferred embodiments of the invention, the coated fabric is characterized by being impervious or highly resistant to the passage of liquid by virtue of its thermoplastic film coating while maintaining a soft cloth-like feel on the uncoated side of the base ply.

The base ply may comprise any suitable fiber material by which term is meant any material made of fibers, whether woven or non-woven, although non-woven fiber materials and in particular non-woven polyolefin fiber materials have been found to have particular utility in the invention. A wide variety of other fibers such as rayon, nylon, polyester and the like may be made into a utilizable fabric by any suitable technique. For example, spun-bonded or carded dry-laid or wet-laid nonwoven fabrics made from staple length or longer fibers may be utilized in the invention. The fiber material comprising the base ply may obviously comprise a mixture not only of different length fibers but of fibers, whether of differing or identical length, which are made from two or more dissimilar materials. For example, composite non-woven materials of nylon-polyethylene, rayon-polypropylene or other suitable combinations may be employed. Non-woven fiber materials suitable for use in the invention, including those made from polypropylene fibers, are commercially available, relatively inexpensive and economically well-suited for use in disposable articles by which is meant articles intended to be disposed after a single use rather than being laundered and reused. Some of these non-woven fiber materials have a soft cloth-like feel which enhances the texture and appearance of garments or other articles made therefrom. Such non-woven fabrics are of course liquid and vapor pervious due to their open construction.

In many applications such as incontinence control garments a liquid-impervious material is required to retain or prevent the passage of liquid such as urine or other physiological fluids from passing therethrough. Thermoplastic films such as polyolefin films, specifically including polypropylene films, are well known for the purpose. For example, disposable diapers conventionally comprise a liquid permeable top sheet, an intermediate absorbent pad or sheet and an outer or back sheet comprising a polypropylene film. While such constructions are useful and have attained extremely wide-spread commercial acceptance, an esthetic drawback exists in that the polypropylene or other thermoplastic film outer covering obviously lacks a cloth-like feel or texture.

Aside from esthetics, it may be desired to adhere either a perforated or unperforated thermoplastic film to a fiber material such as a non-woven polyolefin fiber material. For example, as indicated by the aforesaid U.S. Pat. No. 4,275,105, a perforated thermoplastic film may be combined with a non-woven fiber material by melting the thermoplastic film into the non-woven ply but to a depth less than the depth of the non-woven ply. One difficulty in attempting to coat a surface of a fiber material, in particular a low density non-woven fiber material, with a thermoplastic film is that adhesion sufficiently strong to prevent delamination is often difficult to attain short of melting the thermoplastic film into the matrix of the non-woven fiber material as required by the aforesaid patent. Without wishing to be bound by any particular theory, it is surmised that the relatively low volume density of fibers per unit volume of the fiber material (fibers plus interstitial spaces between the fibers) provides relatively little gripping or bonding area between the film and the fibers. This is a particular problem when it is desired to bond the thermoplastic film to one surface only of the fiber material as opposed to melting the film into the web of fiber material. Obviously, even when bonding a thermoplastic film to a surface only of a fiber material there must be some degree of penetration by the thermoplastic film into the fiber material. However, when it is desired to retain on one side of the coated fabric the texture and feel of the fiber material unpermeated by the thermoplastic film, the fiber volume available to bonding by the thermoplastic film is necessarily limited. This can cause lack of bonding or insufficient adhesion strength particularly when difficult-to-bond combinations of film and fiber material are used.

It has now been discovered that adhesion strength between a given thermoplastic film and a given fiber material, in particular a non-woven fiber material, can be greatly enhanced by providing densified portions of the fiber material to which the thermoplastic film may be heat-bonded with considerably greater strength of adhesion than that which is attainable between the thermoplastic film and the undensified portions of the fiber material. It is believed that the greater volumeric density of fibers per unit volume of fiber material in the densified areas provides an enhanced total fiber surface area which can be contacted by the thermoplastic film for a given depth of penetration and therefore provides greater adhesion strength. It is further believed, without wishing to be bound by any theoretical considerations, that the higher density of material in the densified portions of the fiber material facilitates heat transfer from the hot thermoplastic film being heat-bonded and that this may induce a greater degree of softening of fibers in the densified areas of the fiber material as compared to the undensified areas, or otherwise facilitate the bonding. Generally, the enhanced rate of heat transfer from the hot thermoplastic film to the densified portions and consequent higher temperatures at the densified portions as compared to the undensified portions is believed to enhance bonding strength. The densified portions of non-woven fiber materials are also believed to mechanically improve the tensile and tear strength of such fabrics in addition to providing relatively smooth, dense and high surface areas for adhesion to the thermoplastic film. On the other hand, the undensified portions of the fiber material (or "base ply" as it is sometimes referred to hereinbelow and in the claims) better retain the feel, texture and flexural modulus of the uncoated base ply material. Therefore, the "hand", texture and flexibility of the coated fabric can be selectively varied by varying both the size (surface area on the coating surface of the base ply) of discrete densified and undensified areas and the proportion of densified to undensified portions of the base ply.

The densified portions of the fiber material may be formed in any suitable manner. For example, a non-woven fiber material may simply be embossed to provide a desired pattern of densified portions. The base ply may be embossed by conventional embossing techniques, by being passed through the nip of a pair of rolls having a raised embossing pattern on one roll and a rubber coating on the other, pressure roll. Alternatively, one roll may be embossed with a raised pattern and the other roll may have a corresponding recessed pattern formed therein as is known in the art. Alternatively, any other suitable technique may be utilized such as calendar rolling and/or ultrasonic bonding to provide a suitable densification pattern in the fiber material. The densified portions formed in the non-woven fabric will normally extend throughout the depth thereof and appear on both surfaces of the fiber material although one side of the fabric may have a negative configuration of the pattern appearing on the opposite side. For example, the fabric may have a pattern of densified portions formed therein by being embossed in a waffle-like pattern thereby providing a pattern of interspersed alternate densified and undensified areas. Obviously, any suitable pattern may be utilized including a diamond-like pattern, a checkerboard pattern, a striped pattern, an octagonal pattern, etc., so that the individual densified and undensified areas may be square, rectangular, oval shaped, octagonal shaped, circular, etc. It is preferred that at least one surface has a positive densified portion pattern and that this surface be selected as the coating surface. By a positive pattern it is meant that the densified areas are either flush with or raised above the plane of the coating surface and are not recessed below the plane.

The densified portions of the web provide areas of high adhesion strength between the thermoplastic film and the non-woven fabric and it will usually be desired to alternate rather small discrete areas of densified and undensified portions of the base ply. For example, the base ply may be provided with discrete densified areas having a surface of about 1 to 8 square millimeters interspersed in an alternating pattern with undensified areas of about ¼ to 25 square millimeters each. Individual densified surface areas resulting on the surface of the base ply of non-woven fabric are preferably about 1 to 8 square millimeters each and may be separated from each other by linear distances of about ½ to 5 millimeters, preferably from about ½ to 3 millimeters. Consequently, assuming a square or rectangular checkerboard-like pattern of densified and undensified areas, the undensified areas will measure about ¼ to 25 square millimeters, preferably ¼ to 9 square millimeters. These relative areas are also preferred for non-rectangular patterns. It has been found that the texture of non-woven base ply materials can be selectively altered by changing the relative size and proportion of densified and undensified areas. A fine pattern of densified and undensified areas provides a dimpled appearance to the fabric and provides high adhesion strength between the thermoplastic coating and the coating surface of the base ply, i.e., the surface to which the thermoplastic film is applied without the necessity of melting the thermoplastic film largely or entirely into the depth of the non-woven fabric. Such melting of the thermoplastic film into the matrix provided by the non-woven fabric would stiffen the latter and deprive it of its soft and cloth-like feel because the non-woven material would be filled with the smooth and relatively rigid thermoplastic film.

A non-woven spun-bonded fabric suitable for use in the invention is spun from oscillating spinnerets whose relative speeds of oscillation, conveyor advance speed, fiber denier and filament count may be varied to produce a wide variety of fabrics as is known in the art, e.g., polypropylene non-woven fabrics. Another method of forming non-woven fabrics utilizes short staple fibers of, e.g., polypropylene, having a length of about ¼ to about 2 inches, preferably about ¾ to about one and one half inches and a denier of about 1.5 to 15, preferably about 3. A non-woven fabric may be made by a carded, dry-laid technique as well known in the art to produce a desired fabric weight. For example, a non-woven polypropylene fiber fabric having a fabric weight of from about 0.35 to about 2 ounces per square yard, for example, about 0.68 ounces per square yard as determined by ASTM D-3376-79 may be prepared. The non-woven polypropylene fabric may have a thickness of about 6 to 12 mils, preferably 9.5 mils, as determined in a manner similar to that described in ASTM D-1774-64.

The non-woven polypropylene fiber fabric as described above may be pattern-densified by embossing or other techniques to provide a pattern of interspersed alternating densified and undensified areas. As used herein and in the claims, the "densified" portions of the base ply are simply those portions thereof which have been compacted or otherwise treated to be reduced in thickness and consequently have a higher density of material per unit volume, usually by simply being physically deformation-compacted, as by embossing. For example, a non-woven polypropylene fabric of 0.6 grams per cubic centimeter may have densified portions of 0.9 grams per cubic centimeter.

The heat-bonding conditions must not be so severe as to melt the thermoplastic film substantially entirely into and through the fiber material of the base ply. Rather, the heat-bonding conditions of temperature and contact pressure should be such as to coat the coating surface of the fiber material with the thermoplastic film with the depth of penetration of the thermoplastic film into the fiber material being limited to less than the entire depth of the fiber material, preferably to less than one-half the depth of the fiber material.

A preferred thermoplastic film is one comprising or containing an ethylene acrylate resin, and a preferred combination is a non-woven polypropylene fiber such as one described in detail above, to the contact surface of which a thermoplastic film comprising or containing an ethylene acrylate component, preferably ethylene methyl acrylate, has been heat-bonded. Ethylene methyl acrylate copolymers may comprise about 5% to 80%, say 10% to 30%, methyl acrylate and 95% to 20%, say 90% to 70%, ethylene.

In a preferred method of the invention, ethylene methyl acrylate is extruded at a screw temperature of about 275° to 315° C., preferably a temperature of at least about 293° C. in a film thickness which is preferably from about 0.4 to 10 mils, more preferably about 0.4 to 2 mils thickness. While still in a heat softened state, the extruded film is stretched and brought into pressure contact with a base ply comprising a non-woven polypropylene fiber material, preferably one as described in detail above, and the base ply and the thermoplastic film are brought into pressure contact in the nip of opposed pressure rolls which simultaneously cool and press together the thermoplastic film and the base ply.

For example, the roll which directly contacts the thermoplastic film is preferably water cooled to a temperature of about 25° to 80° F. (about −3.89° to 26.7° C.), preferably about 50° F. (about 10° C.). The cooled roll may be polished, matted or engraved to provide a desired texture to the thermoplastic film. The opposing nip roll may have a rubber or rubber-like surface. A nip pressure of about 60 to 120 pounds per square inch (about 4.22 to 8.44 kg per square cm), preferably about 80 pounds per square inch (about 5.62 kg per square cm) is utilized. In the case of a non-woven polypropylene fiber base ply coated with a thermoplastic film comprising ethylene methyl acrylate, the melting temperature of the polypropylene fiber is much higher than that of the thermoplastic film so that thermal degradation of either the film or the fiber is not a problem. If the extrusion temperature of the thermoplastic film is increased beyond the limits indicated above and the materials are subjected to the same contacting pressure, the thermoplastic film will flow entirely into the base ply resulting in a high adhesion composite of the thermoplastic film embedded within the matrix provided by the non-woven polypropylene fibers. However, the soft cloth-like characteristics of the uncoated side of the coated fabric of this embodiment of the invention is lost and the result is a stiffer, plastic-like composite. If the extruder temperatures are significantly lower than those indicated, the heat-softened thermoplastic film will not flow sufficiently around the fibers of the base ply resulting in poor adhesion so that the base ply is readily pulled from the thermoplastic film. Within the indicated temperature range, high adhesion strength is attained between the thermoplastic film and at least the densified portions of the base ply. Obviously, other extrusion temperature ranges and bonding pressure ranges may be required or useful for other combinations of base ply and thermoplastic film.

In a preferred embodiment of the invention, the ethylene methyl acrylate copolymer is extruded from a normally solid pellet having a specific gravity at 23° C. of at least about 0.94, and preferably about 0.91 to 0.97 as determined in a manner similar to that described in ASTM D-792. Conventional additives may be included in the thermoplastic film, for example, colorant pigments may be added to provide a desired color thereto.

The non-woven base ply material comprises, in a preferred embodiment, polypropylene fibers laid in a fiber mat. The polypropylene fibers may be prepared from a normally solid polypropylene pellet having a specific gravity of at least about 0.9° at 23° C., preferably from about 0.90 to about 0.96 and a melt temperature of from about 160° to 172° C. The non-woven polypropylene fabric base ply preferably has a basis weight of at least about 10 grams per square meter, for example, from about 10 to 40 grams per square meter.

As mentioned above, the coated fabric in accordance with the invention finds utility in a large number of applications. For example, it may be utilized in any article in which it is desired to have a liquid-impervious ply which has on one side thereof a cloth-like feel. This makes it well suited for utilization, for example, in incontinence control garments such as disposable diapers, training panties and the like as well as in surgical gowns and sheets. The coated fabric of the invention may be utilized in such garments with the thermoplastic coated side facing the inside of the garment to provide a liquid barrier and the uncoated side of the fiber material base ply facing the outside of the garment to provide a cloth-like feel and appearance thereto. For example, a disposable diaper or training panty may comprise an inner, liquid-pervious sheet, an intermediate absorbent pad or sheet and an outer backing sheet comprising the coated fabric of the invention placed with the thermoplastic-coated side facing inwardly and the uncoated base ply facing outwardly.

While the invention has been described in detail with respect to specific preferred embodiments thereof, it will be apparent to those skilled in the art upon a reading and understanding of the foregoing that numerous alterations and modifications may be made thereto without departing from the spirit and scope of the invention and the appended claims.

What is claimed is:

1. A coated fabric comprising:
   a base ply of non-woven fiber material having densified and undensified portions thereof defining an interspersed pattern of densified and undensified areas on at least one surface, designated as the coating surface, of the base ply; and
   a thermoplastic film heat-bonded to the coating surface at least at the densified areas thereof, the depth of penetration of the film into the base ply being limited to less than the entire depth of the base ply so that the thermoplastic film comprises a surface coating only on the coating surface of the base ply with an opposite surface of the base ply retaining its fibrous characteristics thereon.

2. The fabric of claim 1 wherein the fiber density of the densified portions of the base ply is at least about one and one-fourth times greater than that of the undensified portions of the base ply and the densified portions define a repeating pattern of densified portions in the base ply.

3. The fabric of claim 1 wherein the densified portions are flush with or protrude above the coating surface.

4. The fabric of claim 1 wherein the fiber material comprises a polyolefin fiber material.

5. The fabric of claim 1 wherein the base ply comprises fibers selected from the group consisting of polypropylene, polyethylene, polypropylene sheathed with polyethylene, polyesters, rayon, nylon and blends of two or more of the foregoing.

6. The fabric of claim 1 including undensified portions defining discrete undensified surface areas on the coating surface of about ¼ to 25 square millimeters each and interspersed among discrete densified portions defining discrete densified surface areas on the coating surface of about 1 to 8 square millimeters each.

7. The fabric of claim 6 wherein the thermoplastic film is selected from the group consisting of polymers of propylene, ethylene methyl acrylate, ethylene vinylacetate, ethylene, block copolymers of butadiene and styrene, ethylene ethyl acrylate, ethylene methyl methacrylates and compatible copolymers of two or more of the foregoing.

8. The fabric of claim 7 wherein the thermoplastic film comprises an ethylene acrylate film.

9. The fabric of claim 8 wherein the thermoplastic film comprises an ethylene methyl acrylate film.

10. The fabric of claim 1 wherein the base ply comprises a polypropylene fiber material having a fabric weight of about 0.35 to 2 ounces per square yard and a thickness of about 6 to 12 mils, and the thermoplastic film comprises ethylene methyl acrylate and has a film thickness of about 0.4 to 10 mils.

11. A multi-ply incontinence control garment wherein the outermost ply thereof comprises the fabric of claim 1 with the base ply thereof facing outwardly.

12. A multi-ply incontinence control garment wherein the outermost ply thereof comprises the fabric of claim 9 with the base ply thereof facing outwardly.

* * * * *